US009829141B2

(12) United States Patent
Vazzana et al.

(10) Patent No.: US 9,829,141 B2
(45) Date of Patent: Nov. 28, 2017

(54) LINESTOPS, NOZZLES AND COMPLETION PLUGS FOR INSTALLATION IN PRESSURIZED PIPES

(71) Applicant: ADS LLC, Huntsville, AL (US)

(72) Inventors: Christopher C. Vazzana, Chicago, IL (US); Carl Mastny, Crete, IL (US); Stephen Roehrig, Plainfield, IL (US); Panagiotis Tsafaras, Elmwood Park, IL (US)

(73) Assignee: Hydra-Stop LLC, Burr Ridge, IL (US)

( * ) Notice: Subject to any disclaimer, the term of this patent is extended or adjusted under 35 U.S.C. 154(b) by 345 days.

(21) Appl. No.: 14/586,386

(22) Filed: Dec. 30, 2014

(65) Prior Publication Data

US 2015/0247602 A1 Sep. 3, 2015

Related U.S. Application Data

(60) Provisional application No. 61/946,416, filed on Feb. 28, 2014.

(51) Int. Cl.
*F16L 37/28* (2006.01)
*F16L 55/11* (2006.01)
*F16L 55/105* (2006.01)

(52) U.S. Cl.
CPC ............ *F16L 55/11* (2013.01); *F16L 55/105* (2013.01); *Y10T 137/613* (2015.04)

(58) Field of Classification Search
CPC ...... F16L 55/11; F16L 55/105; Y10T 137/613

USPC .............................. 138/89, 90; 137/317, 318
See application file for complete search history.

(56) References Cited

U.S. PATENT DOCUMENTS

| 1,833,700 | A | * | 11/1931 | Wolf | ........................ F16K 3/28 137/317 |
| 2,913,012 | A | * | 11/1959 | McCurley | ............... F16L 55/10 138/94 |
| 3,991,791 | A | * | 11/1976 | Luckenbill | .............. F16L 41/16 138/89 |
| 6,810,903 | B1 | | 11/2004 | Murphy et al. | |
| 8,627,843 | B2 | * | 1/2014 | Ries | ...................... F16L 55/105 137/315.29 |
| 2009/0218532 | A1 | * | 9/2009 | Farrelly | .................. F16L 41/06 251/149.6 |

* cited by examiner

*Primary Examiner* — Patrick F Brinson
(74) *Attorney, Agent, or Firm* — Miller, Matthias & Hull LLP

(57) ABSTRACT

This patent document discloses an improved series of nozzles and completion plugs for use in installing linestops in pressurized pipes. The improved nozzles are capable of accommodating two different types of completion plugs, including a threaded completion plug and a push-in type completion plug that is held in place within the nozzle by pins that extend through a flange of the nozzle. Lower edges of the nozzles are designed to facilitate the welding of the nozzle to an upper clamp or upper saddle member. Specifically, the lower or proximal beveled edge includes an inner lip that acts as a dam to prevent seepage of welding material between the proximal edge of the nozzle and the upper saddle member during the welding of the former to the latter.

6 Claims, 6 Drawing Sheets

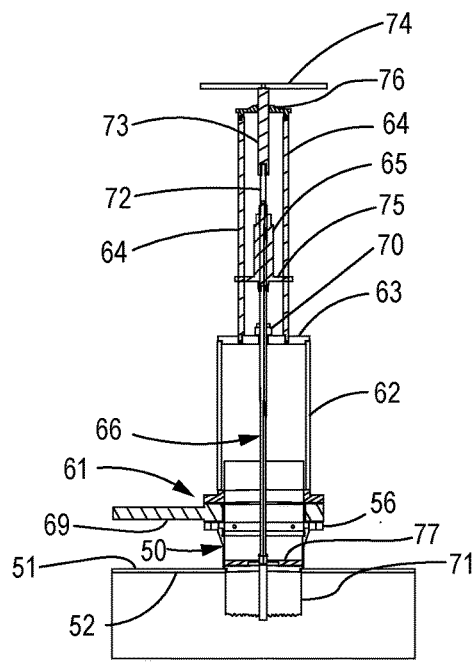
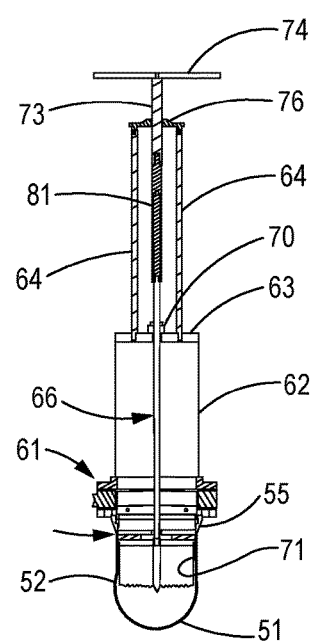
FIG. 4  FIG. 5
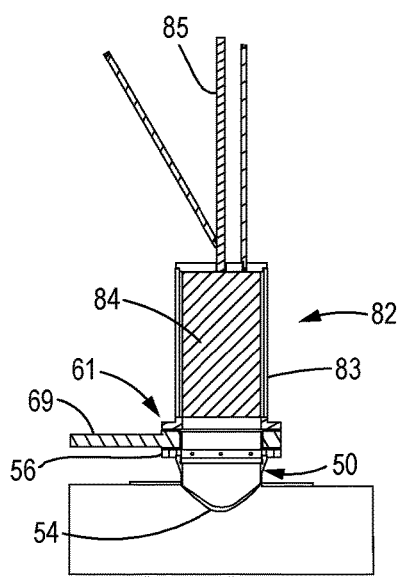
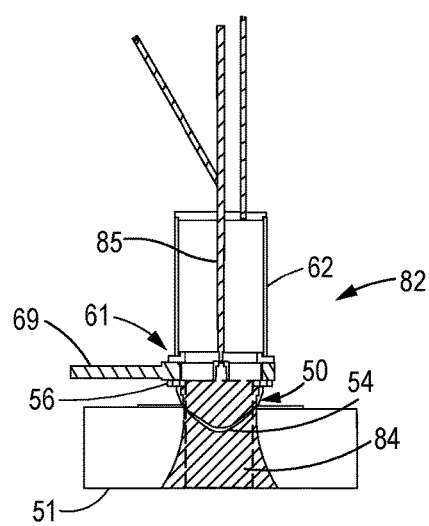
FIG. 6  FIG. 7

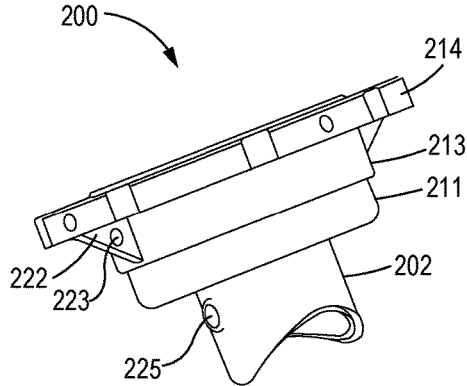
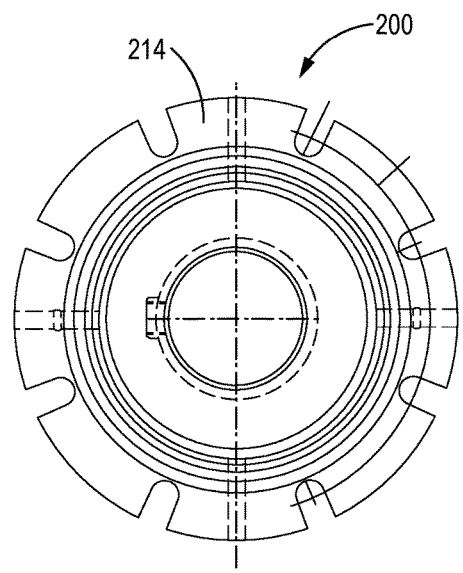
FIG.9  FIG. 10
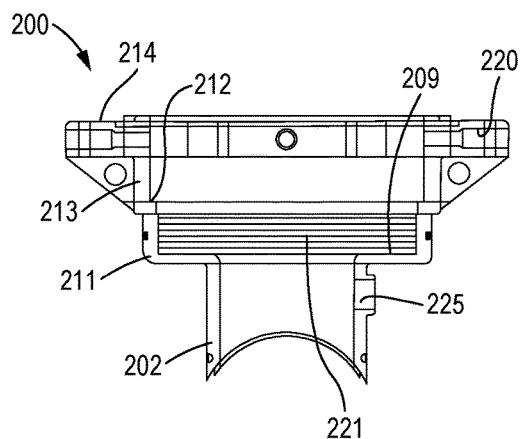
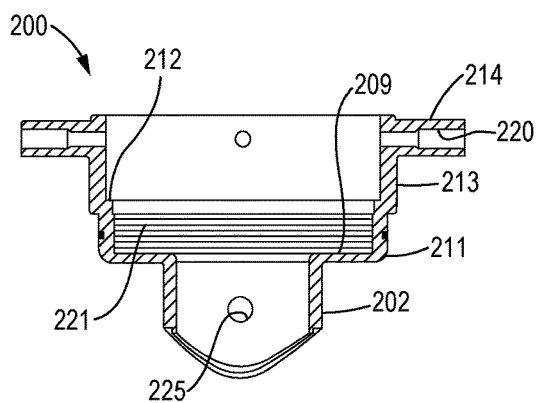
FIG. 11  FIG. 12

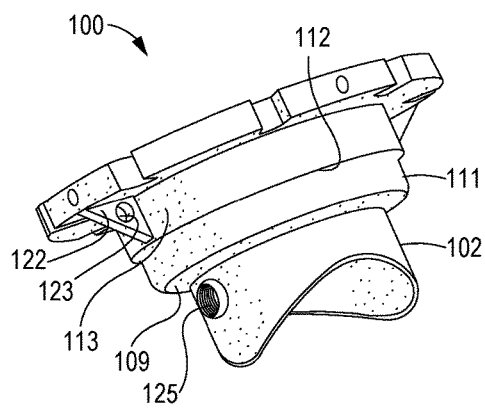
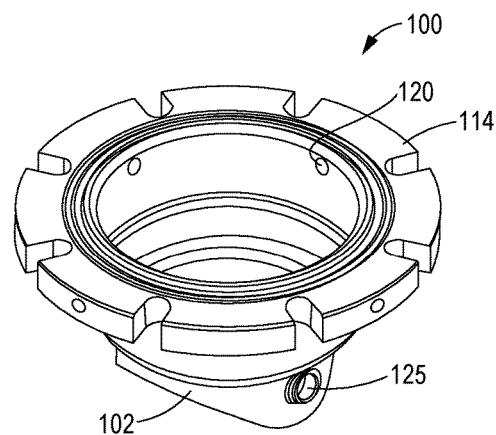
FIG. 13
FIG. 14
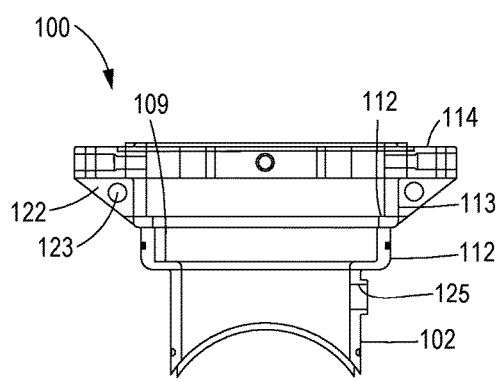
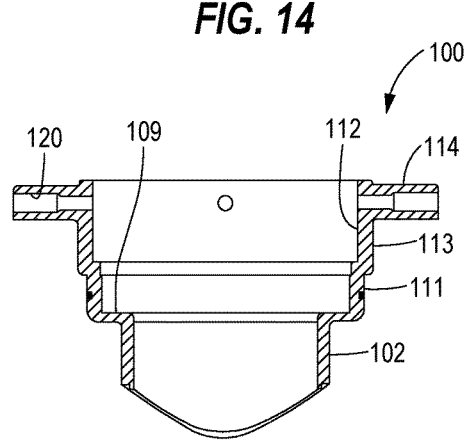
FIG. 15
FIG. 16
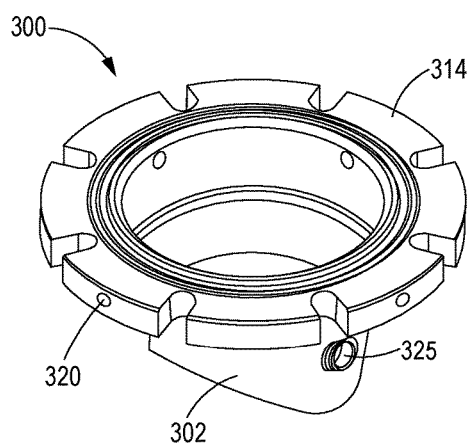
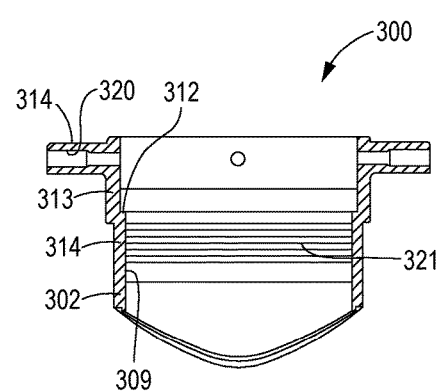
FIG. 17
FIG. 18

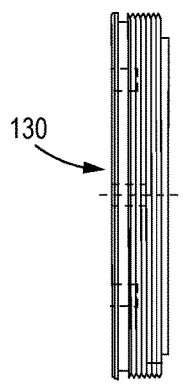
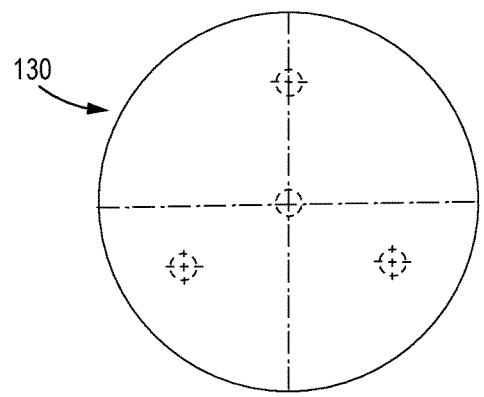
FIG.19  FIG.20
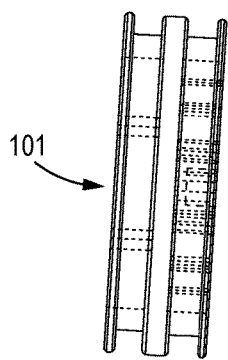
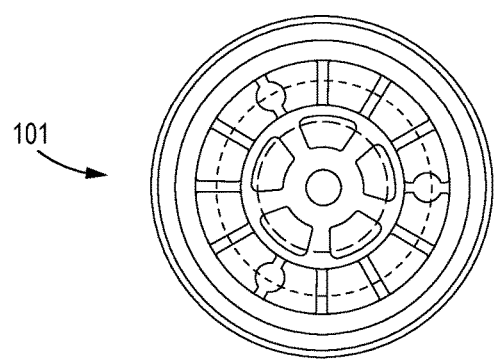
FIG.21  FIG.22

US 9,829,141 B2

LINESTOPS, NOZZLES AND COMPLETION PLUGS FOR INSTALLATION IN PRESSURIZED PIPES

BACKGROUND

Technical Field

This disclosure relates generally to linestops for temporarily shutting off flow in a pressurized pipe. More specifically, this disclosure relates to installation assemblies for such linestops that include a nozzle and a completion plug that may be used to install linestops in pipes of varying sizes.

Description of the Related Art

Pressurized pipes convey fluids, both liquid and gas, in municipalities, industrial plants, and commercial installations. When originally installed, these pipes include block valves used to isolate sections of the pipe for repairs, relocation, or installation of new components into the pipe. When a shutdown is required in a municipal water system, a large area may be deprived of water service. Accordingly, schools, hospitals, commercial and/or industrial facilities may have to be shut down in addition to the inconvenience to residents.

The length of pipe to be isolated during a shutdown can be shortened by adding additional plugs or linestops, in conjunction with the preexisting block valves. Linestops may be installed in a pressurized pipe without service interruption and with minimal fluid loss. If such a linestop is installed, upon completion of the work on the depressurized section of the pipe, the linestop can be retracted and the block valves opened, thereby restoring flow through the repaired section of pipe.

Typically, a linestop is installed through a housing that is clamped to the pressurized pipe that is known in the art as a nozzle or a nozzle assembly. In most cases, the nozzle includes a cylindrical housing section that is clamped perpendicular and pressure-tight to the outside of the pipe by a saddle assembly. Communication is established by a process called pressure tapping, hot tapping or under-pressure tapping. This process is well known in the art, and utilizes a temporary valve, such as a knife valve, mounted on the nozzle and a pipe tapping assembly mounted on top of the knife valve. The knife valve is opened to allow a cutting or drilling device from the pipe tapping assembly to be lowered through the knife valve and through the nozzle to cut a hole through the pipe without significant loss of fluid pressure or fluid flow. After the pipe is cut, the cutting device and coupon (i.e., the cut portion of the pipe) are withdrawn and the knife valve is closed. Then, the pipe tapping assembly is removed and a linestop installation assembly that includes a linestop is mounted on top of the knife valve. The knife valve is then opened and the linestop is lowered into place within the pipe and compressed to form a plug that stops flow through the pipe. After work on the pipe is complete, the linestop can be withdrawn through the knife valve and into the linestop installation assembly before the knife valve can be closed. Then, the linestop installation assembly is removed so the linestop can be replaced with a completion plug. Using the linestop installation assembly, the completion plug is passed through the knife valve before it is secured in place in the nozzle. With the completion plug in place in the nozzle, the linestop installation assembly and knife valve may be removed and replaced with a cover plate known in the art as a blind flange.

Two types of completion plugs are available. First, the completion plug and the nozzle may be threaded for threadably securing the completion plug in the nozzle. Second, the completion plug may be a push-in type of completion plug that is held in place within the nozzle by pins. Further, customers demand the availability of both types of completion plugs. As a result, both types of completion plugs must be manufactured for each size (ID) of pipe (i.e., typically four, six and eight inches), thereby requiring the manufacture of at least six different completion plugs.

The current method of manufacturing nozzles for linestops is labor intensive and includes significant machining and welding. Specifically, the nozzle includes a cylindrical housing that is welded to a flange at its distal end and welded perpendicularly to an upper saddle member at its proximal end after an opening is plasma cut in the upper saddle member. Welding the proximal end of the nozzle to the upper saddle member is difficult as the welding material is prone to seeping between the proximal or lower end of the nozzle and the upper saddle member. Further, pipes having a common internal diameter (ID), e.g., eight inches, may have varying outer diameters (ODs), depending on the thickness of the pipe, the material used to fabricate the pipe, the pressure rating and the end use. Currently, the size of the nozzle is varied for each pipe ID, not each pipe OD, but the size of the saddle assembly is varied for each pipe OD. As a result, the proximal end of the nozzle may not have a diameter that exactly matches that of the upper saddle member, which exacerbates the problem of welding material seeping between the proximal end of the nozzle and the upper saddle member. Further, nozzles are not typically able to accommodate both types of completion plugs and therefore as many as six different nozzles must be manufactured for the three common sizes of pipe (i.e., four, six and eight inches). It would be advantageous to provide a single nozzle for each pipe ID that could accommodate both types of completion plugs. Such a nozzle design would reduce the number of nozzles required for three different pipe IDs from six to three.

Other problems associated with nozzles for linestops include difficulties associated with installing the nozzles below ground level because the nozzles are not equipped with a structure that can be used to tether the nozzle to a winch. Further, the manufacture of the nozzles is expensive due to the amount of machining and welding that is required in addition to the six different nozzles that linestop installers must keep in stock to service four, six and eight inch pipe sizes.

Accordingly, improved nozzles and completion plugs are needed that may be used to install linestops in pressurized pipes.

SUMMARY OF THE DISCLOSURE

In one aspect, this disclosure describes a nozzle and completion plug combination. The disclosed combination includes a nozzle including a cylindrical proximal section that extends between a lower proximal end and an annular lower transition section. The lower transition section extends radially outwardly from the proximal section to a cylindrical middle section. The middle section extends from the lower transition section to an annular upper transition section. The upper transition section extends radially outwardly from the middle section to a cylindrical distal section. The distal section extends from the upper transition section to a distal flange. The distal flange includes a plurality of through holes for receiving pins that extend into the distal section. The middle section includes a threaded inner wall. The combination further includes a completion plug selected from the group consisting of a threaded completion plug that threadably couples to the threaded inner wall of the middle section and a push-in type completion plug with a plurality of recesses and that is frictionally received in the distal section of the nozzle and help in place by the pins. When a push-in type completion plug is utilized, each pin may be partially received in one of the through holes of the distal flange and partially received in one of the recesses of the push-in type completion plug.

In another aspect, this patent disclosure describes a nozzle for use in installing linestops in pipes. The disclosed nozzle includes a cylindrical proximal section that extends between a lower proximal end and an annular lower transition section. The proximal section has an ID of eight inches or less. The lower transition section extends radially outwardly from the proximal section to a cylindrical middle section. The middle section has an ID of greater than eight inches. The middle section extends between the lower transition section and an annular upper transition section. The upper transition section extends radially outwardly from the middle section to a cylindrical distal section. The distal section has an ID of greater than the ID of the middle section. The distal section is connected to a distal flange. The middle section includes a threaded inner wall. The distal flange includes a plurality of through holes for receiving pins that extend into the distal section. The lower proximal end of the proximal section includes a beveled lower edge with an inner lip that is flush with an inner surface of the proximal section and that extends proximally beyond the lower edge. Further, the proximal section, lower transition section, middle section, upper transition section, distal section and distal flange are cast as a unitary structure.

In another aspect, this patent disclosure describes a method of providing a nozzle and completion plug for pipes having IDs of four, six or eight inches. The method includes providing three cast nozzles, wherein each nozzle includes a cylindrical proximal section extending between a lower proximal end and an annular lower transition section. The proximal section has an ID selected from the group consisting of four, six and eight inches. The lower transition section extends radially outwardly from the proximal section to a cylindrical middle section. The middle section has an ID of greater than eight inches. The middle section extends from the lower transition section to an annular upper transition section. The upper transition section extends radially outwardly from the middle section to a cylindrical distal section. The distal section has an ID of greater than the ID of the middle section. The distal section extends from the upper transition section to a distal flange. The distal flange includes a plurality of through holes for receiving pins that extend into the distal section. The middle section includes a threaded inner wall. The method further includes providing a completion plug selected from the group consisting of a threaded completion plug that threadably couples to the threaded inner wall of the middle section and a push-in type completion plug having an OD that matches the ID of the distal section and having a plurality of recesses for receiving the pins with each pin partially received in one of the through holes of the distal flange and partially received in one of the recesses of the push-in type completion plug.

In any one or more of the embodiments described above, the nozzle may be cast as a unitary structure.

In any one or more of the embodiments described above, the push-in type completion plug accommodates an o-ring that engages an inner wall of the distal section of the nozzle.

In any one or more of the embodiments described above, the threaded completion plug accommodates an o-ring that engages an unthreaded portion of the middle section.

In any one or more of the embodiments described above, the proximal section may have an ID selected form the group consisting of four, six, and eight inches.

In any one or more of the embodiments described above, the lower proximal end of the proximal section includes a beveled lower edge with an inner lip that is flush with an inner surface of the proximal section and that extends proximally beyond the lower edge.

In any one or more of the embodiments described above, at least one of the distal flange and distal section are connected to a gusset. The gusset may include a through hole.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 4 is another illustration of the assembly shown in FIGS. 2-3, with the cylindrical cutting device having cut the pipe or, in other words, illustrating a completion of the pressure tapping operation.

FIG. 5 is an end sectional view of the assembly as shown in FIG. 4 after the pressure tapping has been completed and after removal of the actuator. In the position shown in FIGS. 4-5, the cylindrical cutting device is ready to be drawn upwards through the temporary valve and into the installation housing.

FIG. 6 illustrates a linestop installation assembly mounted on top of the knife valve and loaded with a linestop that is ready to be installed in the pipe.

FIG. 7 is an illustration of the assembly as shown in FIG. 6 but with the linestop having been pressed downward into the pipe.

FIG. 9 is a perspective view of a disclosed nozzle for installation on a small pipe, e.g., a four inch ID pipe.

FIG. 10 is a top plan view of the nozzle shown in FIG. 9.

FIG. 11 is a front plan view of the nozzle shown in FIGS. 9-10.

FIG. 12 is a sectional view of the nozzle shown in FIGS. 9-11.

FIG. 13 is a perspective view of a disclosed nozzle for installation on medium size pipe, e.g., a six inch ID pipe.

FIG. 14 is another perspective view of the nozzle shown in FIG. 13, particularly illustrating a threaded middle section.

FIG. 15 is a front plan view of the nozzle shown in FIGS. 13-14.

FIG. 16 is a sectional view of a nozzle shown in FIGS. 13-15.

FIG. 17 is a perspective view of a nozzle for installation on a large size pipe, e.g., an eight inch ID pipe.

FIG. 18 is a sectional view of the nozzle shown in FIG. 17.

FIG. 19 is a side plan view of a threaded type completion plug made in accordance with this disclosure.

FIG. 20 is a top plan view of the completion plug shown in FIG. 19.

FIG. 21 is a side plan view of a push-in type completion plug made in accordance with this disclosure.

FIG. 22 is a top plan view of the completion plug shown in FIG. 21.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments herein.

DETAILED DESCRIPTION OF THE PRESENTLY PREFERRED EMBODIMENTS

Figure 1:
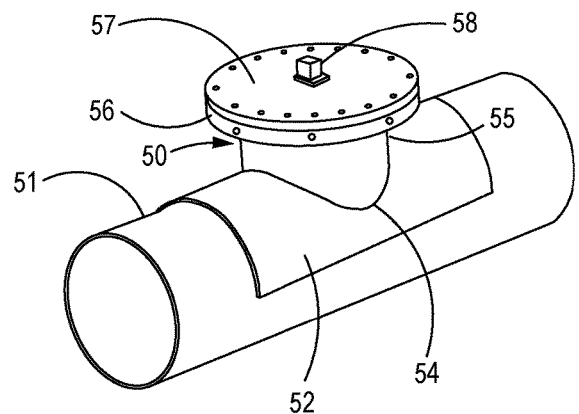
FIG. 1 is a perspective view of a disclosed nozzle installed on a section of a pipe.

FIG. 1 is a perspective view of a nozzle 50 mounted to a section of a pipe 51 that may be a pressurized pipe or conduit such as a municipal water main. Other applications for installing a linestop in a pressurized pipe or conduit will be apparent to those skilled in the art and this disclosure in no way is limited to municipal applications. Those skilled in the art will be aware of industrial and commercial needs for installing a linestop in a pressurized pipe or conduit without the need for depressurizing the pipe or conduit.

Figure 8:
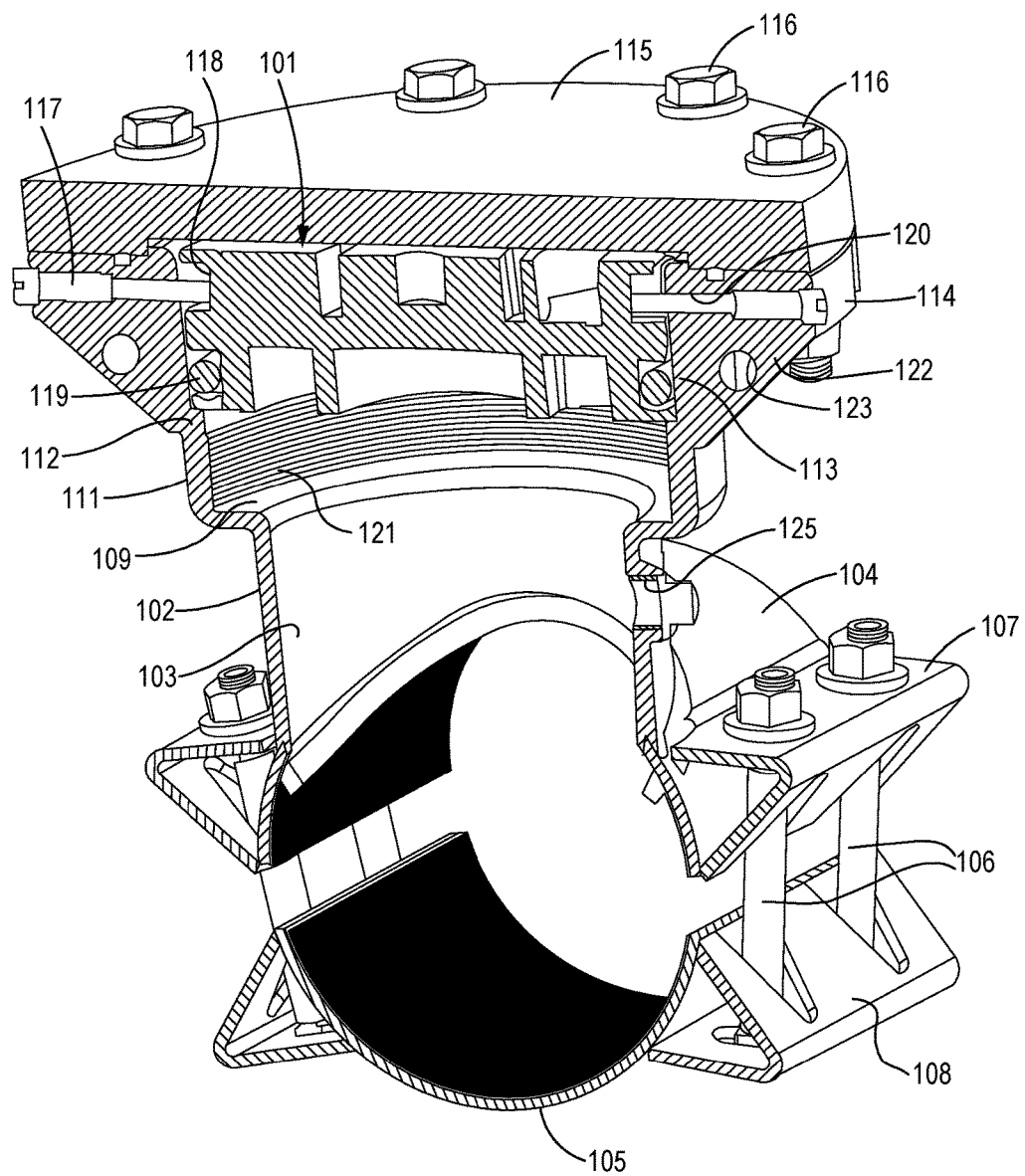
FIG. 8 is a sectional view of a disclosed nozzle installed on a pipe with a push-in type completion plug installed in the nozzle and with a blind flange installed on top of the nozzle and completion plug.

Still referring to FIG. 1, the nozzle 50 is welded to an upper saddle member 52. More specifically, the upper saddle member 52 and the proximal end 54 of the nozzle 50 are welded together while a distal end 55 of the nozzle 50 is connected to a flange 56, which, in turn, may be coupled to a cover plate or blind flange 57. The lower saddle member is not shown in FIG. 1; an exemplary lower saddle member 105 is shown in FIG. 8.

Figure 2:
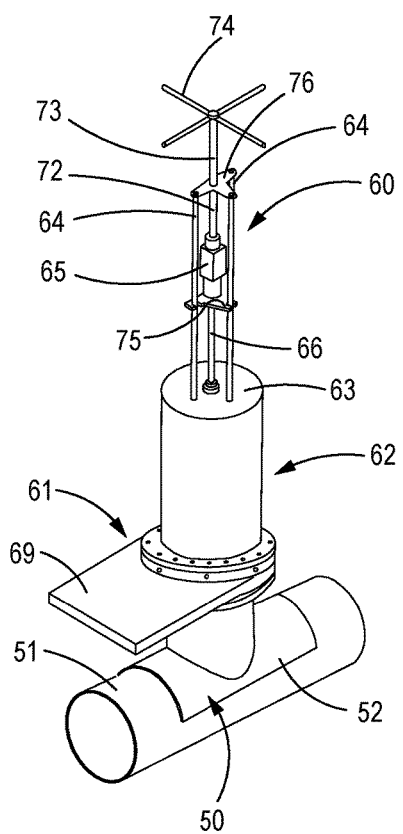
FIG. 2 is a perspective view of the nozzle and cylindrical pipe as shown in FIG. 1 during an installation process and further illustrating a temporary knife valve disposed between the nozzle and a pipe tapping assembly.
Figure 3:
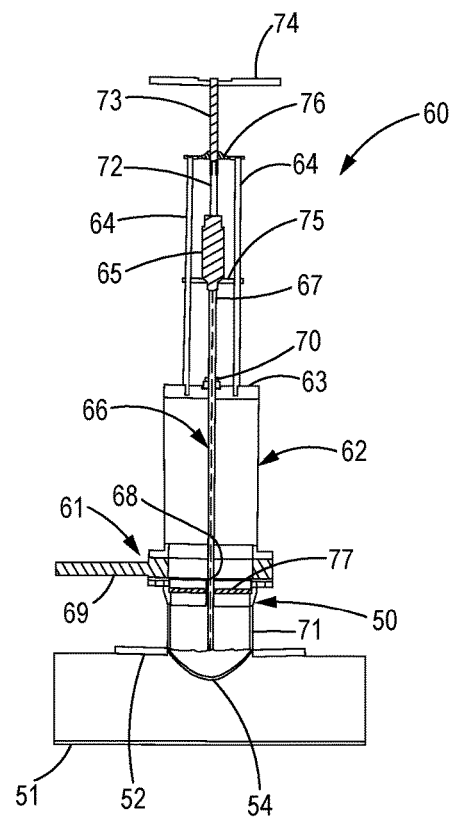
FIG. 3 is a sectional view of the assembly shown in FIG. 2, particularly illustrating the temporary knife valve in an open position with a cylindrical cutting device disposed in the nozzle and ready to cut a hole in the pipe.

Turning to FIGS. 2-3, a pipe-tapping assembly 60 is shown. To install a linestop 58 (see FIGS. 6-7) in the pressurized pipe 51 without depressurizing the pipe 51, the nozzle 50 is first welded to the upper saddle member 52 and then the upper saddle member 52 is placed on the pipe 51 and clamped to the pipe 51 with straps, clamps or other devices that will be apparent to those skilled in the art that may be used to secure a tight fit and at least a partial seal between the upper saddle member 52 and the pipe 51. For example, as shown in FIG. 8, an upper saddle member 104 may be coupled to a lower saddle member 105 by a plurality of bolts 106.

Returning to FIGS. 2-3, with the blind flange 57 removed, a temporary valve 61 may be mounted on the flange 56 of the nozzle 50. In the embodiment shown, the temporary valve 61 is a knife valve or a gate valve that features a slidable plate 69 that may be moved to the right in FIG. 3 to block any flow from the nozzle 50 to the pipe-cutter housing 62. The pipe-cutter housing 62 may be mounted on top of the temporary valve 61 as shown in FIGS. 2-3. The pipe-cutter housing 62 may include a cover 63 and may contain any fluid within the pipe-cutter housing 62. In FIGS. 2-3, the pipe-tapping assembly 60 is being readied to cut a hole in the pipe 51. Specifically, a plurality of guideposts 64 are mounted on top of the cover 63. The guideposts 64 prevent rotational movement of the actuator 65, which may be a motor, such as an air motor, electric motor, hydraulic motor, etc. Other types of actuators 65 will be apparent to those skilled in the art. The actuator 65 may be coupled to a mandrel or shaft 66 having a distal end 67 coupled to the actuator 65 and a proximal end 68 coupled to a cylindrical pipe-cutter 71. Using the actuator 65, the shaft 66 is rotated thereby rotating the pipe-cutter 71 to penetrate and cut a hole in the pipe 51 as shown in FIGS. 4-5.

Still referring to FIG. 3, one or more shafts or extensions 72, 73 may be used to connect the actuator 65 to a handle 74. The actuator 65 may also be equipped with a plate 75 that engages the guideposts 64 to prevent rotation of the actuator 65. Further, a packing nut 70 may be used to seal a central opening in the cover 63 to prevent leakage. An additional combination plate/nut 76 may be used to stabilize the guideposts 64 as well as the extension shafts 72, 73. Further, the pipe-cutter 71 may be coupled to a centering ring 77 to ensure that the cut made by the pipe-cutter 71 is in alignment with the inside diameter of the nozzle 50 and as illustrated in FIG. 4.

In FIGS. 4-5, the pressure tapping operation has been completed as the pipe-cutter 71 has cut through the pipe 51. In FIG. 5, the actuator 65 has been removed and a longer extension shaft 81 has been inserted between the shaft 66 and the shaft 73. At this point, the pipe-cutter 71 may be pulled upward through the temporary valve 61 and into the pipe-cutter housing 62. The temporary valve 61 may then be closed or the plate 69 moved to the right in FIG. 4 to isolate the cylindrical pipe-cutter 71 in the pipe-cutter housing 62 thereby exposing the nozzle 50 to the pressure flowing through the pipe 51.

With the temporary valve 61 in a closed position, the pipe-cutter housing 62 and pipe-cutter 71 may be safely removed and replaced by a linestop installation assembly 82 as shown in FIG. 6. The linestop installation assembly 82 includes a cylindrical housing 83 that accommodates a linestop 84. With the knife valve 61 in the open position as shown in FIG. 6, the linestop 84 may be pumped or pushed downward into the pipe 51 and compressed to form a plug or a seal as shown in FIG. 7. The linestop installation assembly 82 may also be used to remove the linestop 84 from the pipe 51. The linestop 84 may be retracted back into the cylindrical housing 83 through the open knife valve 61. After closing the knife valve 61, the linestop installation assembly 82 may then be removed and the linestop 84 removed from the shaft 85 and replaced with a completion plug 101, 130 (not shown in FIGS. 6-7, see FIGS. 20-22). The linestop installation assembly 82 is then re-mounted on top of the knife valve 61, the knife valve 61 opened and then a completion plug 101, 130 may be extended downward into the nozzle 50 where it is secured in place with pins (see completion plug 101 of FIG. 22) or a threaded connection (see completion plug 130 of FIGS. 20-21) as explained in greater detail below.

Turing to FIG. 8, an improved nozzle 100 and completion plug 101 are illustrated. The nozzle 100 includes a cylindrical proximal section 102 having a proximal end 103 that is welded to an upper saddle member 104. More specifically, a hole or opening is plasma cut in the upper saddle member 104 and the proximal end 103 of the proximal section 102 of the nozzle 100 is welded to the upper saddle member 104. The upper saddle member 104 is coupled to a lower saddle member 105 by a plurality of bolts or fasteners 106 that couple the bracket 107 of the upper saddle member 104 to the bracket 108 of the lower saddle member 105.

Returning to the nozzle 100, the proximal section 102 connects to an annular lower transition section 109. The lower transition section 109 extends radially outwardly from the proximal section 102 to the cylindrical middle section 111. The middle section 111 extends from the lower transition section 109 to an annular upper transition section 112. The upper transition section 112 extends radially outwardly from the middle section 111 to a cylindrical distal section 113. The distal section 113 extends from the upper transition section 112 to a distal flange 114. The distal flange 114 connects to a blind flange 115 that may be secured to the distal flange 114 with a plurality of bolts or fasteners 116.

The completion plug 101 shown in FIG. 8 is a push-in type completion plug that is held in place with a plurality of pins 117 that extend through holes 120 that extend radially through the distal flange 114 as shown in FIG. 8. The completion plug 101 includes a plurality of recesses 118 for receiving the pins 117. The completion plug 101 may also accommodate an o-ring 119 for purposes of providing a seal against the distal section 113 of the nozzle 100. It will also be noted that the nozzle 100 can accommodate a screw-type completion plug (not shown in FIG. 8, see FIGS. 20-21). Specifically, the middle section 111 includes a threaded inner wall 121 for threadably coupling with the threaded-type completion plug 122 shown in FIGS. 20-21. Additional details of the completion plug 101 shown in FIG. 8 are also shown in FIGS. 21-22. Returning to FIG. 8, because the nozzle 100 may be manufactured using investment casting, the nozzle 100 may also include at least one gusset 122 with a through hole 123 disposed therein that facilitates the installation of the nozzle 100 on a pipe 51. Specifically, the gusset 122 can be used to secure the nozzle 100 to a winch to facilitate lowering the nozzle 100 from a ground level location or from a truck bed down to the pipe 51, which most likely is disposed below ground level. Further, the use of investment casting to manufacture the nozzle 100 makes it relatively easy to include one or more test ports 125.

In FIG. 8, the proximal section 102 of the nozzle 100 is sized to fit a medium-sized pipe 51 or, for example, a six inch ID pipe 51. FIGS. 14-17 illustrate additional details of the nozzle 100. FIGS. 9-12 illustrate a nozzle 200 with a proximal section 202 sized for installation on a smaller-sized pipe 51 or, for example, a four inch ID pipe 51. Again, the nozzle 200 can accommodate both types of completion plugs 101, 130, including the threaded-type completion plug 122 of FIGS. 20-21 and the push-in type completion plug 101 shown in FIG. 22. Similarly, the nozzle 300 shown in FIGS. 18-19 is for installation onto a larger-sized pipe 51, such as eight inch ID pipe 51. The nozzle 300 can also accommodate both types of completion plugs 101, 130. The details of the nozzle 200 and the nozzle 300 that are also found in the nozzle 100 are identified with the same tens and ones digits while changing only the hundreds digits (e.g., the distal sections 113, 213, 313).

INDUSTRIAL APPLICABILITY

A new process was investigated utilizing investment castings instead of weldments and machining for the manufacture of the nozzles for linestop installations. Use of investment castings for the nozzles increases the pressure ratings of the nozzles. Further, castings enable various features to be incorporated into the nozzles that could not be economically utilized before, such as gussets for attaching chains or ropes for raising and lowering the nozzles as well as one or more test ports.

While only certain embodiments have been set forth, alternatives and modifications will be apparent from the above description to those skilled in the art. These and other alternatives are considered equivalents and within the spirit and scope of this disclosure.

The invention claimed is:

1. A nozzle comprising:
  a cylindrical proximal section extending between a lower proximal end and an annular lower transition section, the proximal section having an ID of 8 inches or less, the lower transition section extending radially outwardly from the proximal section to a cylindrical middle section, the middle section having an ID of greater than 8 inches, the middle section extending between the lower transition section and an annular upper transition section, the upper transition section extending radially outwardly from the middle section to a cylindrical distal section, the distal section having an ID of greater than the ID of the middle section, the distal section connected to a distal flange, the middle section including a threaded inner wall, the distal flange includes a plurality of through holes for receiving pins that extend into the distal section,
  the lower proximal end of the proximal section includes beveled lower edge with an inner lip that is flush with an inner surface of the proximal section and that extends proximally beyond the lower edge, and
  wherein the proximal section, lower transition section, middle section, upper transition section, distal section and distal flange are cast as a unitary structure.

2. The nozzle of claim 1 wherein the distal section accommodates a push-in type completion plug.

3. The nozzle of claim 2 wherein the push-in type completion plug accommodates an O-ring that engages an inner wall of the distal section.

4. The nozzle of claim 2 wherein the middle section accommodates a threaded completion plug.

5. The nozzle of claim 1 wherein at least one of the flange and distal section are connected to a gusset, the gusset including a through hole.

6. The nozzle of claim 1 wherein the ID of the proximal section is selected from the group consisting of 4, 6 and 8 inches.

* * * * *